(No Model.)
G. W. GRIFFIN.
HANDSAW.
No. 278,935. Patented June 5, 1883.
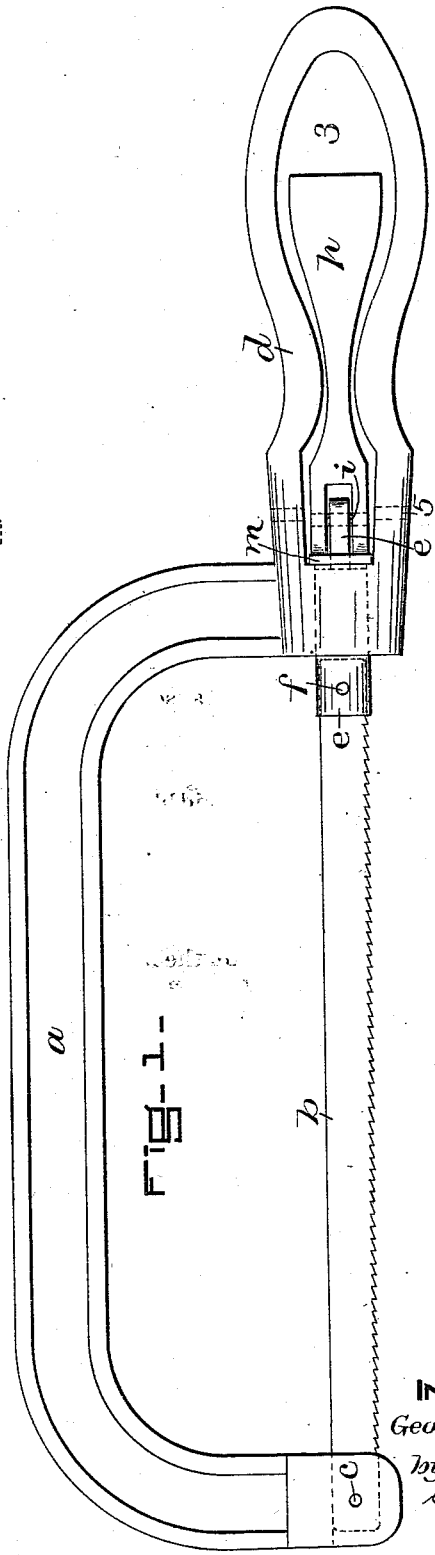
WITNESSES
A. O. Orne
Fred A. Prull
INVENTOR
George W. Griffin
by
Crosby & Gregory
Attys.

UNITED STATES PATENT OFFICE.

GEORGE W. GRIFFIN, OF FRANKLIN FALLS, NEW HAMPSHIRE.

HANDSAW.

SPECIFICATION forming part of Letters Patent No. 278,935, dated June 5, 1883.

Application filed April 4, 1883. (No model.)

*To all whom it may concern:*

Be it known that I, GEORGE W. GRIFFIN, of Franklin Falls, county of Merrimack, State of New Hampshire, have invented an Improvement in Saw-Frames, of which the following description, in connection with the accompanying drawings, is a specification, like letters on the drawings representing like parts.

My invention relates to a frame for saw-blades, and has for its object to produce a convenient and simple device for straining the saw-blade to the proper tension. The said frame is composed, mainly, of a single casting of U shape, provided at one end with means for attaching one end of the saw-blade, and at its other end with a handle for operating the saw-frame and saw, the said handle being open, or of skeleton construction. The end of the frame provided with the handle has a socket to receive a movable saw-attaching device adapted to be attached to the end of the saw-blade and passing through an opening in the said frame toward the handle. The said blade-attaching device is connected with a straining device consisting of a cam-lever pivoted to turn toward and from the plane of the saw-frame, and of proper shape to enter the opening of the handle, so that when turned to the position to strain the saw it lies wholly within the handle, thus making a very convenient, compact, and inexpensive arrangement for straining the saw-blade.

Figure 1 is a side elevation of a saw-frame embodying this invention; Fig. 2, a longitudinal section of the handle portion thereof, showing the straining device in plan view.

The frame $a$, of the usual U shape, is provided at one end with means for fastening the end of the saw-blade $b$ thereto, it being shown in this instance as having a pin, $c$, passing through a hole in the frame and saw-blade, the end of the said frame being slotted or forked to receive the saw-blade within it. The other end of the frame is provided with a handle, $d$, shown as of skeleton construction, or having an opening, 3. The end of the frame $a$, near the junction of the handle $d$ therewith, is provided with a socket, or bored, as shown at 4, Fig. 2, to receive the movable saw-attaching device $e$, slotted to receive the end of the saw-blade $b$, which is fastened therein by a pin, $f$. The end of the said movable saw-attaching device $e$ extends into the open part of the handle $d$, where it is flattened to form a tongue, $e'$, which enters the slotted end of the straining-lever $h$, and is connected therewith by a pivot-pin, $i$, the said pin being nearer the sides of the said lever $h$ than its end $h'$, which thus constitutes a cam, so that when the said lever is turned at right angles to the frame, as shown in dotted lines, Fig. 2, the saw-attaching device $e$ is permitted to move outward through the opening 4 in the frame, as shown in dotted lines, thus permitting the saw-blade to be easily attached thereto, the said blade being loose or slack. When, however, the lever $h$ is turned into the position shown in full lines, occupying the space 3 within the handle $d$, the said saw-attaching device $e$ is drawn toward the handle, thus tightly straining the saw-blade, while the said lever $h$ is wholly inclosed within the handle, so as not to interfere with the use of the saw-frame.

The flattened portion or tongue $e'$ of the saw-attaching device preferably passes through a washer, $m$, of rectangular shape, fitted within the opening 3 of the handle, adjacent to the frame, the said opening at this point being rectangular in cross-section, so that the said washer $m$ prevents the rotation of the saw-attaching device $e$, and keeps its saw-receiving slot in substantially the same plane as the saw-frame.

The handle $d$ is provided with a small hole, (shown in dotted lines at 5,) to enable the pivot-pin $i$ of the straining-lever $h$ to be inserted or removed in putting the straining mechanism together in the frame.

It will be seen that the blade attaching and straining mechanism is of very simple construction and convenient in operation, there being no accurate fitting required in any of the parts, which may all consist of simple castings.

I claim—

1. The combination, with the frame having an open handle, of the straining device contained within the said handle, substantially as and for the purpose described.

2. The frame having one end adapted to have a saw-blade attached thereto, and provided at its other end with an open handle, combined with the movable blade-attaching device and the straining-lever pivoted thereto and adapted to enter the opening of the handle, substantially as described.

3. The frame having an open handle provided with a hole, 5, combined with the movable blade-attaching device, rectangular washer, and the straining-lever pivoted to the said attaching device, as described, whereby its end constitutes a cam to move the attaching device and strain the saw, substantially as set forth.

In testimony whereof I have signed my name to this specification in the presence of two subscribing witnesses.

GEO. W. GRIFFIN.

Witnesses:
 FRANK PROCTOR,
 ALEXIS PROCTOR.